United States Patent

[11] 3,549,078

| [72] | Inventor | William S. Fortune<br>14250 Dearborn St., Panorama City,, Calif. 91402 |
|---|---|---|
| [21] | Appl. No. | 718,176 |
| [22] | Filed | Apr. 2, 1968 |
| [45] | Patented | Dec. 22, 1970 |

[54] SOLDER REMOVER IMPLEMENT
6 Claims, 10 Drawing Figs.

[52] U.S. Cl. .................................................. 228/20,
219/234, 228/19, 228/52
[51] Int. Cl. ................................................ B23k 1/00,
B23k 5/22
[50] Field of Search ............................................ 228/20;
219/234; 228/19, 51; 219/230

[56] References Cited
UNITED STATES PATENTS

| 3,114,026 | 12/1963 | Fortune .......................... | 228/20 |
| 3,392,897 | 7/1968 | Siegel ............................. | 228/20 |
| 3,393,854 | 7/1968 | Fortune .......................... | 228/20 |
| 3,422,247 | 1/1969 | Royston et al. ................ | 228/20X |

*Primary Examiner*—John F. Campbell
*Assistant Examiner*—Robert J. Craig
*Attorneys*—Daniel T. Anderson ABSTRACT: A vacuum desoldering tool including a spring loaded piston disposed within a hollow, cylindrical body open at one end and closed at the other by a tip member having a hollow duct member extending forward for drawing up the molten solder.

PATENTED DEC 22 1970 3,549,078

WILLIAM S. FORTUNE
INVENTOR,
BY,
Daniel T. Anderson
ATTORNEY.

SOLDER REMOVER IMPLEMENT

This invention relates generally to soldering and more particularly to a novel hand tool for removing molten solder from a previously soldered connection, especially an electrical connection of two or more conductors as on a circuit board.

The problem of desoldering an electrical connection such as a wire wrapped about a terminal post on a circuit board is well known to modern engineers and technicians in electronics maintenance, research, development, and testing activities; the mechanical connection cannot be properly uncoupled without melting the solder; but the solder immediately solidifies when the tool for unwinding the lead is applied thereto. The surface tension of the molten solder is generally such as to preclude the liquid solder from adhering to the hot soldering iron. The molten metal may sometimes be removed by blowing it away or by briskly shaking the circuit board or chassis; but obviously, these techniques are not satisfactory practices particularly when delicate and complex circuitry is involved.

In recent years vacuum solder removing tools and systems have been developed whereby after the solder to be removed has been liquified, it is drawn cleanly away from the terminal by a vacuum or suction action.

Some of the vacuum solder removing tools and systems have solved certain aspects of the desoldering problem with varying degrees of success. Some of these comprise relatively elaborate central vacuum systems with individual vacuum lines and nozzles and solder traps as for each bench in a laboratory. Such systems are, however, expensive and suffer the further disadvantage of being tied to a central system and being thereby bulky and not truly portable, and thereby being limited to quite special utilization.

Another example, at the other end of the complexity spectrum, is a rubber squeeze ball with an affixed nozzle. The device is inexpensive, simple, and portable, but is severely limited in the magnitude and shape of the impulse of air which it can draw. Furthermore, when the squeezed bulb is released, it is inherently difficult to keep the nozzle close to the terminal having thereon the molten solder to be drawn off.

Other hand solder removing tools have been developed; however, to varying degrees, they are, for some applications, unnecessarily complex, bulky, expensive, or difficult to hold in a precise location during their vacuum stroke due to the inertia of their moving parts. Furthermore, some of these tools utilize a spring loaded piston with an external cocking plunger which could cause serious eye damage to the operator thereof. An additional limitation typically suffered by the prior art devices is that their air passages periodically become clogged by the resolidified solder and must be disassembled to be cleaned.

It is accordingly an object of the present invention to provide a vacuum actuated solder removing tool which is not subject to these and other limitations and disadvantages of the prior art.

It is another object to provide such an implement which is exceedingly small, inexpensive, and easy to operate and which is automatically self-cleaning.

It is another object to provide such a tool which is reliable over a very long lifetime and produces a strong consistent vacuum pulse.

It is another object to provide such a tool which does not require an externally extending cocking plunger and the moving parts of which have very low inertia.

Briefly, in accordance with certain of the structural aspects of the invention, these and other objects are achieved in an example thereof which includes a hollow, cylindrical body member open at one end and substantially closed at the other by a tip member having a hollow duct member extending axially centrally therefrom for drawing the molten solder therethrough.

A piston member is axially slidingly disposed within the cylindrical body. A compression coil spring is affixed at its end to the forward tip member and to the forward portion of the piston member.

A trigger mechanism is carried by the piston and comprises a small radially outwardly biased plunger which, when the piston member is forced, during a cocking action, forwardly toward or against the tip member, snaps outwardly through a trigger engaging aperture in the wall of the cylindrical body member and, by engagement therewith, holds the piston member forwardly against the opposing forces of the compressed spring.

When it is desired to produce a vacuum stroke as for removing molten solder, the forward tip member is placed next thereto and the trigger member is compressed as by the index fingertip of the operator. To be particularly noted is that the fingertip not only permits the flyback stroke of the piston member, but also automatically seals the trigger-engaging aperture whereby the entire air current of the vacuum stroke is drawn through the duct portion of the tip member of the apparatus.

To recock the apparatus, the piston member is directly engaged, as by the operator's index finger, through the rearward open end of the cylindrical body member and forced forwardly against the opposing force of the compression spring until the trigger plunger is engaged by the trigger aperture in the forward portion of the wall of the cylindrical body member. Then when a second vacuum stroke is desired, the above triggering process may be repeated.

Further details of these and other novel features and their operation as well as additional objects and advantages of the invention will become apparent and be best understood from a consideration of the following description taken in connection with the accompanying drawing which is presented by way of illustrative example only and in which.

Figure 1:
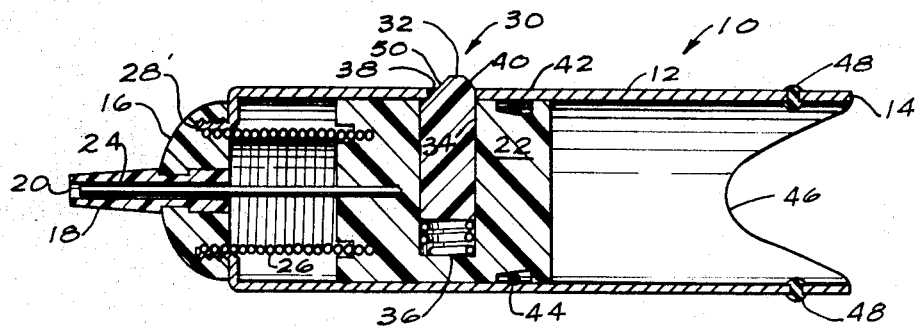
FIG. 1 is a longitudinal sectional view of an example of a solder remover implement constructed in accordance with the principles of the present invention.

With specific reference now to the FIGS. in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention. The description taken with the drawing will make it apparent to those skilled in the mechanical arts how the several forms of the invention may be embodied in practice. Specifically, the detail showing is not to be taken as a limitation upon the scope of the invention which is defined by the appended claims forming, along with the drawing, a part of this specification.

Referring to FIG. 1, the example of the solder removing implement 10 there shown includes a substantially cylindrical hollow body member 12 which is open at its rearward end 14 and is, in this example, threadingly secured to a forward tip member 16 which is substantially closed except for a tubular duct portion 18 thereof which has a central bore 20 providing air flow communication between the interior forward portions of the body member 12 and the external environment. The portion 18 may be fabricated from teflon or a similar heat resistant, nonsolder adherence material.

Figure 2:
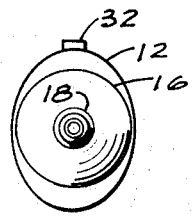
FIG. 2 is a forward end elevation view thereof.
Figure 3:
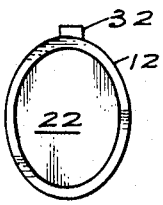
FIG. 3 is a rearward end elevation view thereof.

A piston member 22 having a cross-sectional configuration geometrically conforming substantially to that of the body member 12 is axially slidingly disposed therewithin. In this example, for purposes of precluding angular motion or rotation of the piston member with respect to the housing body, the cross-sectional configuration of these portions is more or less elliptical as shown more clearly in FIGS. 2 and 3. Note, from FIG. 2, that the forward tip member 16 and the duct portion 18 are circular while the tubular body member 12 is, in contrast, noncircular.

A forwardly extending duct cleaning rod member 24 is carried by the forward portion of the piston member 22. When the piston member is urged all the way forwardly as during a cocking operation, the rod member 24 extends all or at least substantially all the way forwardly through the bore 20 thusly automatically ejecting any residual solder bits therefrom.

Disposed between the piston member 22 and the forward tip member 16 with its respective ends affixed thereto is a compression coil spring 26. In this example, the spring is shown threaded into the forward portion of the piston member 22 and threadingly secured annularly between the forward end 28 of the tubular body member 12 and the tip member 16 as shown.

A trigger assembly 30 comprising a trigger actuating plunger member 32 disposed in a bore 34 and biases radially outwardly by a small compression coil spring 36 is carried by the piston member 22. Angularly and axially aligned with the plunger member 32 is a trigger receiving and engaging aperture 38 formed through the wall of the tubular body member 12. At least the rear top edge of the trigger plunger member 32 is beveled as shown at 40 so that when the fingertip of the operator depresses the actuator plunger to create a vacuum stroke with the implement 10, the flyback of the piston member 22 will readily occur as the beveled edge 40 engages the rear edge of the aperture 38 without requiring that the entire plunger top be depressed through the wall thickness of the body member 12.

A conical bottomed piston ring retaining channel 42 is provided circumferentially about the rear portion of the piston member 22. The conical surface has its smaller diameter disposed rearwardly whereby during the flyback of the piston, the O-ring 44 is urged outwardly radially compressively between the piston and the cylinder wall; while during the cocking stroke the O-ring is frictionally displaced rearwardly whereby there is substantially no additional frictional drag created between the piston sealing O-ring 44 and the inner cylinder wall of the body member 12.

The rear, open end 14 of the body member 12 may be formed with a deep, forwardly extending scallop 46 therein to aid in cocking the piston member 22 with the index finger of the operator. In addition, when desired, one or more rubber buttons 48 may be inserted in a grommet fashion near the rear extremity of the body member 12 to assure that the piston member 22 remains axially contained within the body member 12 at all times.

In operation, the operator may cock the piston member 22 by urging it all the way forwardly with his index finger until the trigger actuator plunger member 32 pops out of its receiving aperture 38. In this step, the piston may be pushed even further forwardly against the beveled forward edge 50 of the trigger actuator plunger member 32 whereby the cleaning rod member 24 is urged all the way forwardly to clean the full length of the bore 20 when desired. The apparatus is then cocked and ready for use. When the solder to be removed is fully molten, as by application thereto of a sufficiently hot soldering iron, the tip of the duct portion 18 is placed contiguously to the molten solder and the trigger actuator 32 depressed. The operator's finger automatically seals the aperture 38 and the resultant piston flyback action produces a strong impulse of air flow into the apparatus through the bore 20 drawing with it the quantity of molten solder.

Figure 4:
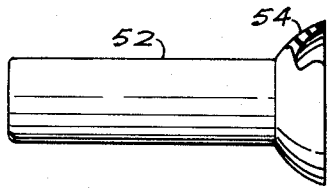
FIG. 4 is a side elevation view of an auxiliary cocking mechanism useful in cooperation with portions of the invention shown in the other FIGS.

With reference to FIG. 4, an auxiliary cocking apparatus is illustrated. A cocking plunger 52 is mounted upon a rubberlike suction fastener means 54 by which the plunger 52 may be readily affixed to a wall or workbench surface in the area where the soldering and desoldering activities are to be performed. By means of the plunger 52 the implement 10 may be readily cocked preparatory to each vacuum stroke by placing the open rear end 14 thereof over the body of the plunger 52 and then forcefully moving the body of the implement 10 toward the wall or workbench surface upon which the fastener means 54 is mounted whereby the piston member 22 is urged forwardly into its cocked and ready position.

Figure 5:
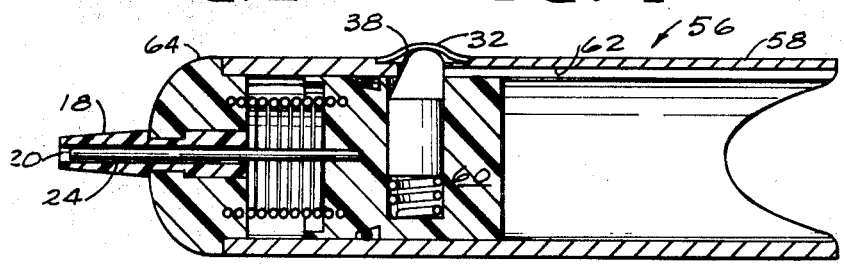
FIG. 5 is a longitudinal sectional view of an alternative example of the invention.

In the example of the invention illustrated in FIG. 5, a solder removing implement 56 is shown which is in many respects similar to that of FIG. 1; and, accordingly, like reference numerals are applied to those portions with the description given above being incorporated here by reference. The examples of the invention vary, however, in that the cylindrical body portion 58 and the piston member 60 are, in this example, circular in cross section and the means for maintaining angular alignment therebetween is a longitudinal channel 62 which extends rearwardly from the aperture 38. During the flyback of vacuum producing stroke, the upper extremity of the trigger actuator plunger member 32 slides axially along the channel 62 thusly maintaining alignment while at the same time providing a sealing action to restrict the flow of air about the piston member 60 by way of the channel 62.

The implement 56 is further different in this example in that the forward tip portion 64 is removably press fit into the forward end of the tubular body member 58. During the cocking stroke of the piston member 60, when the piston member is pushed slightly excessively forwardly, the cleaning rod member 24 cleans the full length of the bore 20, as described above; when, however, the piston member is urged even further forwardly, the tip member 64 is ejected as for replacement or cleaning and oiling, when desired, of the internal portions of the implement.

Figure 6:
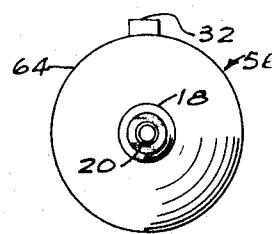
FIG. 6 is a forward end elevational view of the structure of FIG. 4.

FIG. 6 illustrates a forward end view of the circular cylindrical configuration of the implement 56.

Figure 7:
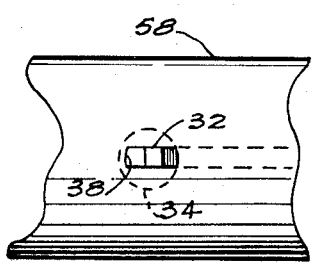
FIG. 7 is a plan view of a portion of the structure of FIG. 4.

In FIG. 7, the aperture 38 through the wall of the body member 58 with the trigger actuator plunger member 32 projecting therethrough is illustrated. The trigger plunger receiving bore 34 and the retaining or alignment channel 62 are shown in broken, phantom lines.

Figure 8:
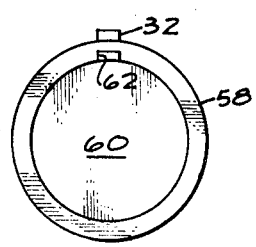
FIG. 8 is a rearward end elevation view thereof.

Similarly to FIG. 6, the rearward view of FIG. 8 illustrates the circular configuration of the implement 56 and shows the trigger actuating plunger member 32 and its retaining channel 62 in the cylindrical body member 58.

Figure 9:
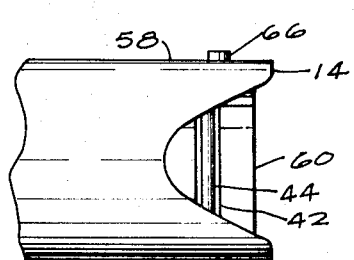
FIG. 9 is a side elevational view of a rear portion of an alternative example of the invention.
Figure 10:
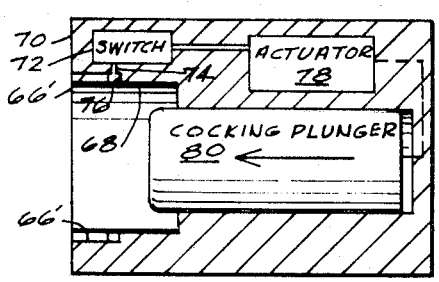
FIG. 10 is a sectional view of an automatic cocking apparatus for use with other portions of the invention.

Referring to FIG. 9, an example of the invention is illustrated in which the rearward extremity 14 of the body member 58 is formed to include a pair of bayonet type lug elements 66 extending radially outwardly therefrom. These are of the character to engage a pair of bayonet lug receiving channels 66' formed in the cylindrical wall of the implement receiving bore 68 of an automatic cocking assembly 70. An electrical, in this example, switch 72 is mounted on the assembly 70 with its actuator 74 extending into the axially holding portion 76 of one of the bayonet receiving channels 66'. In operation, the actuator 76 is engaged when the body member 58 is inserted into the bore 68 and one of the lugs 66 travels along its respective channel 66' and is then rotated into the holding or locking portion 76 thereof. This action triggers a plunger actuator 78 which in turn drives axially outwardly into the bore 68 and the body member 58, a cocking plunger 80 which engages and urges into a cocked position the piston member 60. The body portion 58 may then be rotated to disengage the lugs 66 from the holding portions 76 of the channels 66' and withdrawn from the bore 68 to be utilized to provide a solder removing vacuum stroke when and where desired.

There have thus been disclosed a number of examples of a solder remover implement which achieves the objects and exhibits the advantages set forth hereinabove.

I claim:
1. Solder removing apparatus comprising:
   cylindrical hollow body member having forward and rearward ends, the latter being open to the surrounding environment:

a forward tip member secured to said forward end of said hollow body member and having a hollow, molten solder receiving duct portion extending forwardly therefrom and communicating with the forward internal portion of said hollow body member, the remainder of said forward tip member being closed to the surrounding environment;

piston member axially slidingly disposed within said hollow body member;

compression spring member affixed to each of and disposed within said hollow body member between said forward tip member and said piston member;

trigger means carried by said piston member and including a radially outwardly biased trigger actuator plunger member;

trigger plunger engaging aperture means formed through a forward wall portion of said hollow body member at a predetermined angular disposition thereon for receiving said trigger actuator plunger member when said piston member is urged forwardly toward said tip member; and trigger alignment means carried by said hollow body member for maintaining said trigger actuator plunger member at said predetermined angular disposition.

2. The invention according to claim 1 which further includes a duct cleaning rod element carried by said piston member and extending axially forwardly through said hollow duct portion of said forward tip member when said piston member is urged forwardly toward said tip member.

3. The invention according to claim 1 in which said trigger alignment means consists in said cylindrical hollow body member and said piston member disposed slidably therewithin being noncircular in cross-sectional configuration.

4. The invention according to claim 3 in which said noncircular configuration is oblong.

5. The invention according to claim 1 in which said hollow cylindrical body member and said piston member disposed slidably therewithin are circular in cross-sectional configuration and in which said trigger alignment maintaining means comprises a longitudinal channel formed along the inner wall of said cylindrical body member and extending along a line between said trigger plunger engaging aperture means and said open rearward end, and in which the cross-sectional configuration of said channel and of the radially outer portion of said trigger actuating plunger member are in geometric conformance.

6. The invention according to claim 1 which further includes automatic cocking means comprising:

housing body means;

cocking plunger means carried by said housing body means;

power driven means for moving said cocking plunger means axially outwardly;

receiving means carried by said housing body means for receiving said rearward open end of said cylindrical body member;

mating, holding means carried by said receiving means and said rearward open end of said cylindrical body member for axially removably securing said cylindrical body member to said receiving means; and switch means carried by said housing body means of the character actuated by engagement of said mating holding means to energize said power driven means for moving said cocking plunger means axially outwardly in a manner to urge said piston member forwardly toward said forward tip end member thereby to cock said piston member by engagement of said trigger plunger actuating member by said trigger plunger engaging aperture means.